(12) United States Patent
Laubhan et al.

(10) Patent No.: US 8,395,100 B2
(45) Date of Patent: Mar. 12, 2013

(54) MICROWAVE HEATING CONSTRUCT WITH ELEVATABLE BOTTOM

(75) Inventors: Vicki Laubhan, Arvada, CO (US); Kelly R. Fitzwater, Lakewood, CO (US); Weston R. Wilson, Arvada, CO (US)

(73) Assignee: Graphic Packaging International, Inc., Marietta, GA (US)

( * ) Notice: Subject to any disclaimer, the term of this patent is extended or adjusted under 35 U.S.C. 154(b) by 793 days.

(21) Appl. No.: 12/583,079

(22) Filed: Aug. 13, 2009

(65) Prior Publication Data

US 2010/0038359 A1 Feb. 18, 2010

Related U.S. Application Data

(60) Provisional application No. 61/188,925, filed on Aug. 14, 2008.

(51) Int. Cl.
*H05B 6/80* (2006.01)
*H05B 6/64* (2006.01)

(52) U.S. Cl. ........ 219/729; 219/730; 219/731; 219/732; 219/733; 219/734; 219/735; 219/759

(58) Field of Classification Search .............. 219/729, 219/730, 731, 732, 733, 734, 735, 759
See application file for complete search history.

(56) References Cited

U.S. PATENT DOCUMENTS

| | | | |
|---|---|---|---|
| 4,260,060 A | 4/1981 | Faller | |
| 4,267,420 A | 5/1981 | Brastad | |
| 4,268,738 A | 5/1981 | Flautt, Jr. et al. | |
| 4,279,933 A | 7/1981 | Austin et al. | |
| 4,286,136 A | 8/1981 | Mason, Jr. | |
| 4,567,341 A | 1/1986 | Brown | |
| 4,626,641 A | 12/1986 | Brown | |
| 4,678,882 A | 7/1987 | Bohrer et al. | |
| 4,742,203 A | 5/1988 | Brown et al. | |
| 4,745,249 A | 5/1988 | Daniels | |
| 4,775,771 A | 10/1988 | Pawlowski et al. | |
| 4,810,844 A | 3/1989 | Anderson | |
| 4,835,352 A | 5/1989 | Sasaki et al. | |
| 4,865,921 A | 9/1989 | Hollenberg et al. | |
| 4,883,936 A | 11/1989 | Maynard et al. | |
| 4,888,459 A | 12/1989 | Keefer | |
| 4,890,439 A | 1/1990 | Smart | |
| 4,891,482 A * | 1/1990 | Jaeger et al. | 219/730 |

(Continued)

FOREIGN PATENT DOCUMENTS

| | | |
|---|---|---|
| EP | 0 563 999 A2 | 10/1993 |
| EP | 0 656 301 A1 | 6/1995 |

(Continued)

OTHER PUBLICATIONS

International Search Report and Written Opinion—PCT/US2009/053675, mailed Mar. 30, 2010.

(Continued)

*Primary Examiner* — Ngan Ngo
(74) *Attorney, Agent, or Firm* — Womble Carlyle Sandridge & Rice, LLP

(57) ABSTRACT

A microwave heating construct includes a movable portion defined at least partially by lines of disruption extending between adjacent edges of the bottom panel. The movable portion is adapted to be moved towards the interior space for maintaining a food item in an elevated position within the construct. A susceptor or other microwave energy interactive element may be joined to the movable portion to enhance heating, browning, and/or crisping of the food item.

34 Claims, 5 Drawing Sheets

U.S. PATENT DOCUMENTS

| | | | |
|---|---|---|---|
| 4,894,247 A | 1/1990 | Fong | |
| 4,894,503 A | 1/1990 | Wendt | |
| 4,896,009 A | 1/1990 | Pawlowski | |
| 4,916,280 A | 4/1990 | Havette | |
| 4,927,991 A | 5/1990 | Wendt et al. | |
| 4,933,193 A | 6/1990 | Fisher | |
| 4,936,935 A | 6/1990 | Beckett | |
| 4,940,867 A * | 7/1990 | Peleg | 219/730 |
| 4,962,293 A | 10/1990 | Lackey | |
| 4,963,424 A | 10/1990 | Beckett | |
| 4,968,865 A | 11/1990 | Seaborne et al. | |
| 5,008,507 A | 4/1991 | Pesheck et al. | |
| 5,034,234 A | 7/1991 | Andreas | |
| 5,039,364 A | 8/1991 | Beckett et al. | |
| 5,041,325 A | 8/1991 | Larson et al. | |
| 5,053,594 A | 10/1991 | Thota et al. | |
| 5,081,330 A | 1/1992 | Brandberg et al. | |
| 5,084,601 A | 1/1992 | Andreas | |
| 5,096,723 A | 3/1992 | Turpin | |
| 5,117,078 A | 5/1992 | Beckett | |
| 5,140,119 A | 8/1992 | Brown et al. | |
| 5,164,562 A | 11/1992 | Huffman et al. | |
| 5,177,332 A | 1/1993 | Fong | |
| 5,213,902 A | 5/1993 | Beckett | |
| 5,217,768 A | 6/1993 | Walters et al. | |
| 5,221,419 A | 6/1993 | Beckett | |
| 5,231,268 A | 7/1993 | Hall et al. | |
| 5,239,153 A | 8/1993 | Beckett | |
| 5,247,149 A | 9/1993 | Peleg | |
| 5,256,846 A | 10/1993 | Walters | |
| 5,260,070 A | 11/1993 | Peleg | |
| 5,260,537 A | 11/1993 | Beckett | |
| 5,266,386 A | 11/1993 | Beckett | |
| 5,294,763 A | 3/1994 | Chamberlain et al. | |
| RE34,683 E | 8/1994 | Maynard et al. | |
| 5,334,820 A | 8/1994 | Risch | |
| 5,340,436 A | 8/1994 | Beckett | |
| 5,354,973 A | 10/1994 | Beckett | |
| 5,389,767 A | 2/1995 | Dobry | |
| 5,405,663 A | 4/1995 | Archibald et al. | |
| 5,410,135 A | 4/1995 | Pollart et al. | |
| 5,412,187 A | 5/1995 | Walters et al. | |
| 5,424,517 A | 6/1995 | Habeger et al. | |
| 5,484,984 A | 1/1996 | Gics | |
| 5,510,132 A | 4/1996 | Gallo, Jr. | |
| 5,519,195 A | 5/1996 | Keefer et al. | |
| 5,543,606 A | 8/1996 | Gics | |
| 5,565,125 A | 10/1996 | Parks | |
| 5,585,027 A | 12/1996 | Young | |
| 5,628,921 A | 5/1997 | Beckett | |
| 5,672,407 A | 9/1997 | Beckettt | |
| 5,688,427 A | 11/1997 | Gallo, Jr. | |
| 5,698,127 A | 12/1997 | Lai et al. | |
| 5,759,422 A | 6/1998 | Schmelzer et al. | |
| 5,770,840 A | 6/1998 | Lorence | |
| 5,800,724 A | 9/1998 | Habeger et al. | |
| 5,864,123 A | 1/1999 | Keefer | |
| 5,900,264 A | 5/1999 | Gics | |
| 5,910,268 A | 6/1999 | Keefer | |
| 5,948,308 A | 9/1999 | Wischusen, III | |
| 6,054,698 A | 4/2000 | Mast | |
| 6,114,679 A | 9/2000 | Lai et al. | |
| 6,133,560 A | 10/2000 | Zeng et al. | |
| 6,137,099 A | 10/2000 | Hamblin | |
| 6,150,646 A | 11/2000 | Lai et al. | |
| 6,158,589 A | 12/2000 | Smith et al. | |
| 6,168,812 B1 | 1/2001 | Paulucci | |
| 6,204,492 B1 | 3/2001 | Zeng et al. | |
| 6,251,451 B1 | 6/2001 | Zeng | |
| 6,359,272 B1 | 3/2002 | Sadek et al. | |
| 6,414,290 B1 | 7/2002 | Cole et al. | |
| 6,433,322 B2 | 8/2002 | Zeng et al. | |
| 6,455,827 B2 | 9/2002 | Zeng | |
| 6,501,059 B1 | 12/2002 | Mast | |
| 6,534,755 B1 | 3/2003 | Paulucci | |
| 6,552,315 B2 | 4/2003 | Zeng et al. | |
| 6,559,430 B2 | 5/2003 | Monforton et al. | |
| 6,677,563 B2 | 1/2004 | Lai | |
| 6,717,121 B2 | 4/2004 | Zeng et al. | |
| 6,765,182 B2 | 7/2004 | Cole et al. | |
| 7,019,271 B2 | 3/2006 | Wnek | |
| 7,514,659 B2 | 4/2009 | Lafferty | |
| 8,008,609 B2 | 8/2011 | Noyelle et al. | |
| 8,071,924 B2 | 12/2011 | Lafferty | |
| 2001/0017297 A1 | 8/2001 | Zeng et al. | |
| 2001/0021405 A1 | 9/2001 | Zeng | |
| 2002/0144996 A1 | 10/2002 | Zeng et al. | |
| 2003/0010777 A1 | 1/2003 | Milgrom | |
| 2003/0085224 A1 | 5/2003 | Tsontzidis et al. | |
| 2003/0111463 A1 | 6/2003 | Lai | |
| 2003/0116562 A1 | 6/2003 | Halimi et al. | |
| 2003/0206997 A1 | 11/2003 | Winkelman et al. | |
| 2004/0149746 A1 | 8/2004 | Hoese et al. | |
| 2004/0173607 A1 | 9/2004 | Blankenbeckler et al. | |
| 2004/0232213 A1 | 11/2004 | Pope | |
| 2005/0042360 A1 | 2/2005 | Tiffany et al. | |
| 2006/0049190 A1 | 3/2006 | Middleton | |
| 2006/0113300 A1 | 6/2006 | Wnek | |
| 2006/0157480 A1 | 7/2006 | Lafferty | |
| 2006/0289521 A1 | 12/2006 | Bohme et al. | |
| 2007/0039951 A1 | 2/2007 | Cole | |
| 2007/0056962 A1 | 3/2007 | Hopkins et al. | |
| 2007/0087090 A1 | 4/2007 | Russell et al. | |
| 2007/0228036 A1 | 10/2007 | Noyelle et al. | |
| 2007/0251943 A1 | 11/2007 | Wnek et al. | |
| 2008/0023469 A1 | 1/2008 | Fitzwater | |
| 2009/0120929 A1 | 5/2009 | Lafferty | |
| 2012/0000905 A1 | 1/2012 | Noyelle et al. | |
| 2012/0100265 A1 | 4/2012 | Lafferty | |

FOREIGN PATENT DOCUMENTS

| | | |
|---|---|---|
| EP | 0 970 895 A1 | 1/2000 |
| EP | 1 840 047 | 10/2007 |
| FR | 2 828 394 | 2/2003 |
| GB | 2 368 507 A | 5/2002 |
| JP | 62-191682 | 12/1987 |
| JP | 63-16600 | 1/1988 |
| JP | 64-20331 | 2/1989 |
| JP | 1-97107 | 6/1989 |
| JP | 09132279 A | 5/1997 |
| JP | 09185991 A | 7/1997 |
| WO | WO 89/04585 | 5/1989 |
| WO | WO 92/00899 | 1/1992 |
| WO | WO 97/11010 | 3/1997 |
| WO | WO 03/066435 | 8/2003 |
| WO | WO 2005/085091 A2 | 9/2005 |
| WO | WO 2006/076501 A1 | 7/2006 |
| WO | WO 2006/130789 A1 | 12/2006 |
| WO | WO 2007/123611 A1 | 11/2007 |
| WO | WO 2008/014377 A2 | 1/2008 |
| WO | WO 2008/052096 A1 | 5/2008 |
| WO | WO 2008/115272 A2 | 9/2008 |
| WO | WO 2010/019758 A2 | 2/2010 |

OTHER PUBLICATIONS

Notice of Allowance and Fee(s) Due for U.S. Appl. No. 11/712,294, dated Apr. 25, 2011.

Notice of Allowance and Fee(s) Due for U.S. Appl. No. 12/319,537, dated Jul. 28, 2011.

International Search Report—PCT/US2006/001100, Jan. 13, 2006, Graphic Packaging International, Inc.

Written Opinion—PCT/US2006/001100, Jan. 13, 2006, Graphic Packaging International, Inc.

International Search Report—PCT/US2007/006703, Mar. 16, 2006, Graphic Packaging International, Inc.

Written Opinion—PCT/US2007/006703, Mar. 16, 2006, Graphic Packaging International, Inc.

International Search Report—PCT/US2007/074427, Jul. 26, 2007, Graphic Packaging International, Inc.

Written Opinion—PCT/US2007/074427, Jul. 26, 2007, Graphic Packaging International, Inc.

* cited by examiner

MICROWAVE HEATING CONSTRUCT WITH ELEVATABLE BOTTOM

CROSS-REFERENCE TO RELATED APPLICATION

This application claims the benefit of U.S. Provisional Application No. 61/188,925, filed Aug. 14, 2008, which is incorporated by reference herein in its entirety.

TECHNICAL FIELD

This disclosure relates generally to various blanks, constructs, systems, and methods for containing, heating, browning, and/or crisping a food item in a microwave oven.

BACKGROUND

Microwave ovens provide a convenient means for heating a variety of food items, including dough-based products such as pizzas and pies. However, microwave ovens tend to cook such items unevenly and are unable to achieve the desired balance of thorough heating and a browned, crisp crust. Many commercially available packages attempt to brown and/or crisp the bottom surface of the food item without addressing the need to brown and/or crisp the crust or dough on the top or edges of the food item. Thus, there is a need for a system that provides the desired degree of heating, browning, and/or crisping of both the bottom and top surfaces of the crust or dough of a food item.

SUMMARY

This disclosure relates generally to various cartons, containers, or packages (generally referred to as "constructs"), various blanks for forming such constructs, methods of making such constructs, and methods of using such constructs to heat, brown, and/or crisp a food item in a microwave oven. The constructs also may be used to contain the food item prior to heating. In some examples, the construct may be used with one or more additional components to form a microwave energy interactive system.

The various constructs generally include one or more reconfigurable panels or portions for elevating the food item from the floor of the microwave oven to enhance the heating, browning, and/or crisping of the food item. For example, the construct may include a bottom panel that includes a movable portion that may be moved from a first position substantially coplanar with the remainder of the bottom panel to a second position out of the plane of the remainder of the bottom panel. In the second position, the movable portion may serve as a platform for maintaining the food item in an elevated condition during heating. The transformation from a storage receptacle or container to a heating, browning, and/or crisping construct may comprise separating one or more portions of the container, folding one or more portions of the container or portions removed therefrom, inverting one or more portions of the container or portions removed therefrom, any other transformation, or any combination of transformations.

The constructs may include one or more additional features to enhance the heating, browning, and/or crisping of the food item, for example, microwave energy interactive elements, apertures, vents, insulating elements, or any combination thereof.

Other features, aspects, and embodiments of the invention will be apparent from the following description and accompanying figures.

BRIEF DESCRIPTION OF THE DRAWINGS

The description refers to the accompanying drawings in which like reference characters refer to like parts throughout the several views, and in which.

DESCRIPTION

The present invention may be described further by referring to the figures. For purposes of simplicity, like numerals may be used to describe like features. It will be understood that where a plurality of similar features are depicted, not all of such features necessarily are labeled on each figure. It also will be understood that various components used to form the blanks and constructs of the present invention may be interchanged. Thus, while only certain combinations are illustrated herein, numerous other combinations and configurations are contemplated hereby.

Figure 1A:
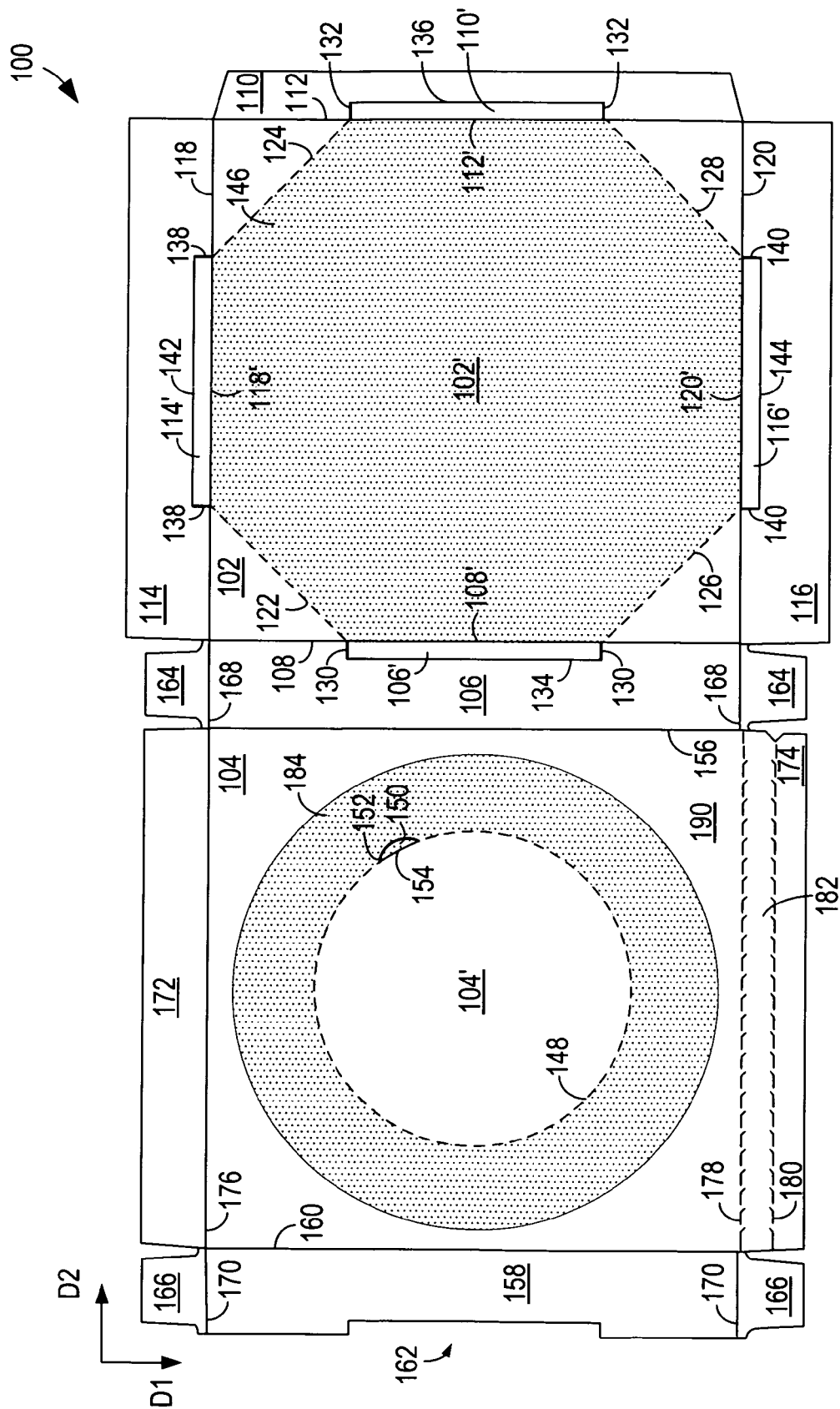
FIG. 1A is a schematic top plan view of one side of an exemplary blank that may be used to form a construct.

FIG. 1A depicts a first side of an exemplary blank 100 that may be used to form a construct 192 or apparatus (e.g., a package or carton) for heating, browning, and/or crisping a food item in a microwave oven (discussed in connection with FIGS. 1C-1G). The blank 100 generally includes a plurality of adjoined panels, each of which has a first dimension, for example, a length, extending in a first direction, for example, a longitudinal direction, D1, and a second dimension, for example, a width, extending in a second direction, for example, a transverse direction, D2. It will be understood that such designations are made only for convenience and do not necessarily refer to or limit the manner in which the blank is manufactured or erected into a construct. The side of the blank 100 shown in FIG. 1A may form the interior side 190 of the construct 192 (FIG. 1C), as will be evident from the remaining discussion.

As shown in FIG. 1A, the blank 100 includes a first major panel (or first main panel) 102 and a second major panel (or second main panel) 104 that may respectively serve as a bottom panel 102 and top panel 104 for the construct 192 (FIGS. 1C-1G) to be formed from the blank 100. A first side panel 106 is joined to the panel 102 along a longitudinal line of disruption, for example, fold line 108. A panel or flap 110 (e.g., a gluing panel or flap) is joined to panel 102 along a longitudinal line of disruption, for example, fold line 112 opposite and substantially parallel to longitudinal fold line 108. A pair of opposed end panels 114, 116 is joined to panel 102 along respective transverse lines of disruption, for example, fold lines 118, 120, which may be substantially parallel to one another. Fold lines 108, 112 may be substantially perpendicular to fold lines 118, 120 such that panel 102 has a substantially square shape, with fold lines 108, 112, 118, 120 extending substantially along and/or defining the peripheral edges of panel 102. However, other configurations of fold lines and shapes are contemplated hereby.

A plurality of oblique lines of disruption 122, 124, 126, 128 extend substantially between each pair of adjacent edges of panel 102 (i.e., substantially along fold lines 108, 112, 118, 120). In this example, the lines of disruption are shown as tear lines. However, it is contemplated that cuts or slits may be used. Tear line 122 extends substantially between fold lines 108, 118, tear line 124 extends substantially between fold lines 112, 118, tear line 126 extends substantially between fold lines 108, 120, and tear line 128 extends substantially between fold lines 112, 120. The oblique lines of disruption 122, 124, 126, 128 and the portions 108', 112', 118', 120' of the fold lines 108, 112, 118, 120 that lie between the endpoints of the oblique lines of disruption 122, 124, 126, 128 collectively circumscribe or define a movable portion 102' of panel 102 that may serve as a platform for maintaining a food item (not shown) in a raised position relative to the floor or turntable of a microwave oven, as will be discussed in connection with FIGS. 1F and 1G.

In this example, the oblique tear lines 122, 124, 126, 128 are substantially equal in length and their respective ends (i.e., endpoints) are equidistant from the respectively adjacent corner of panel 102, such that the resulting movable portion 102' has a substantially symmetrical, substantially octagonal shape. Alternatively, the movable portion 102' can be thought of as having a substantially square shape with chamfered corners. However, other regular and irregular shapes are contemplated by the disclosure. Further, it is also contemplated that non-oblique lines of disruption may be used to form the movable portion 102'. For example, each oblique fold line may be replaced with one or more transverse and/or longitudinal fold lines. The overall shape of the movable portion 102' may vary for each embodiment.

As will be evident from the figures, since the movable portion 102' of panel 102 includes some edges that are substantially collinear with the edges of the panel 102 along fold line portions 108', 112', 118', 120', the remainder of panel 102 (i.e., the portion of panel 102 excluding the movable portion 102') includes four corner portions that are substantially isolated or discrete from one another. However, it is contemplated that the oblique tear lines 122, 124, 126, 128 and the fold lines connecting them (in this example, fold line portions 108', 112', 118', 120') may be distanced from each peripheral edge of panel 102, such that the movable portion 102' may be circumscribed by the remainder of the panel 102 along each peripheral edge of the panel 102.

Still viewing FIG. 1A, panels 106, 110 each include a respective pair of transverse lines of lines of disruption (e.g., cuts, slits, or tear lines) 130, 132 extending away from the respective fold line 108, 112 substantially from the endpoints of the respective oblique tear lines 122, 124, 126, 128 into the respective panel 106, 110. A longitudinal line of disruption (e.g., a fold line or score line) 134, 136 extends substantially between the endpoints of each respective pair of transverse lines of disruption 130, 132. Similarly, panels 114, 116 each include a respective pair of longitudinal lines of lines of disruption (e.g., cuts, slits, or tear lines) 138, 140 extending away from the respective fold line 118, 120 into the respective panel 114, 116. A transverse line of disruption 142, 144 (e.g., a fold line or score line) extends substantially between the endpoints of each respective pair of longitudinal lines of disruption 138, 140.

For each panel 106, 110, 114, 116, cuts 130, 132, 138, 140, fold lines 134, 136, 142, 144, and fold line portions 108', 112', 118', 120' joining their respective endpoints define a hingeable portion 106', 110', 114', 116' of the respective panel 106, 110, 114, 116. Each hingeable portion 106', 110', 114', 116' is foldably joined to the movable portion 102' of the bottom panel 102 along the respectively fold line portion 108', 112', 118', 120'. In this example, each hingeable portion 106', 110', 114', 116' is substantially centered along the major linear dimension of the respective panel 106, 110, 114, 116, (i.e., the first dimension D1 of panels 106, 110 and the second dimension D2 of panels 114, 116). Further, in this example, the cuts 130, 132, 138, 140 are substantially perpendicular to the respectively adjacent fold line portion 108', 112', 118', 120' and to the respectively adjacent fold line 134, 136, 142, 144, such that the resulting hingeable portion 106', 110', 114', 116' is substantially rectangular in shape. However, it is contemplated that the cuts or other lines of disruption may be positioned otherwise and/or may be oblique to one other to define differently positioned and/or shaped hingeable portions. The hingeable portion 106', 110', 114', 116' of each panel 106, 110, 114, 116 may serve as an elevating panel or support panel for the movable portion 102' of the bottom panel 102, as will be described in connection with FIGS. 1F and 1G.

If desired, a microwave energy interactive element 146 (shown schematically with stippling), for example, a susceptor, may overlie and/or may be joined to all or a portion of the bottom panel 102 to define a microwave energy interactive heating surface for receiving the food item (i.e., for supporting the food item in a facing, substantially contacting relationship). In this example, the susceptor 146 overlies substantially the entire movable portion 102' of the bottom panel 102, while the remaining portion or remainder of the bottom panel 102 (in this example, the corner areas) is microwave energy transparent. However other configurations of the susceptor 146 and other microwave energy interactive elements may be used, as will be discussed further below. For example, in one embodiment (not shown), the susceptor may overlie the entirety of the bottom panel 102.

Still viewing FIG. 1A, the second major panel (or second main panel) 104 includes a removable portion 104' defined at least partially by a line of disruption, for example, a tear line 148. If desired, the removable portion 104' may include a tab 150 defined by a line of disruption, for example, a cut line or cut 152 (or slit), that may initiate and terminate substantially along tear line 148. In this example, the cut 152 is substantially arcuate in shape, such that the tab 150 has a substantially semi-circular shape. However, it will be understood that in this and other examples, the tab may have any shape as needed or desired. For example, the tab may be oval, rectangular, square, diamond-shaped, trapezoidal, polygonal, or any other regular or irregular shape. If desired, the tear line 148 may be interrupted by a score line 154 that extends substantially between the endpoints of cut 152. The score line 154 may assist with activation or use of the tab 150.

The top panel 104 is joined to the first side panel 106 along a longitudinal fold line 156. The top panel 104 also is joined to a second side panel 158 along a longitudinal fold line 160 opposite and substantially parallel to longitudinal fold line 156. Panel 158 includes a substantially rectangular cutout 162 generally corresponding to the dimensions and shape of the movable portion 110' of panel 110. In this manner, when the blank 100 is formed into a construct 192 (FIG. 1C) and panel 158 is overlapped with panel 110, panel 158 will not interfere with the operation of the movable portion 110' of panel 110.

Respective pairs of tuck-in panels 164, 166 are joined respectively to opposite longitudinal ends of panels 106, 158 along respective opposed pairs of transverse fold lines 168, 170.

Figure 1B:
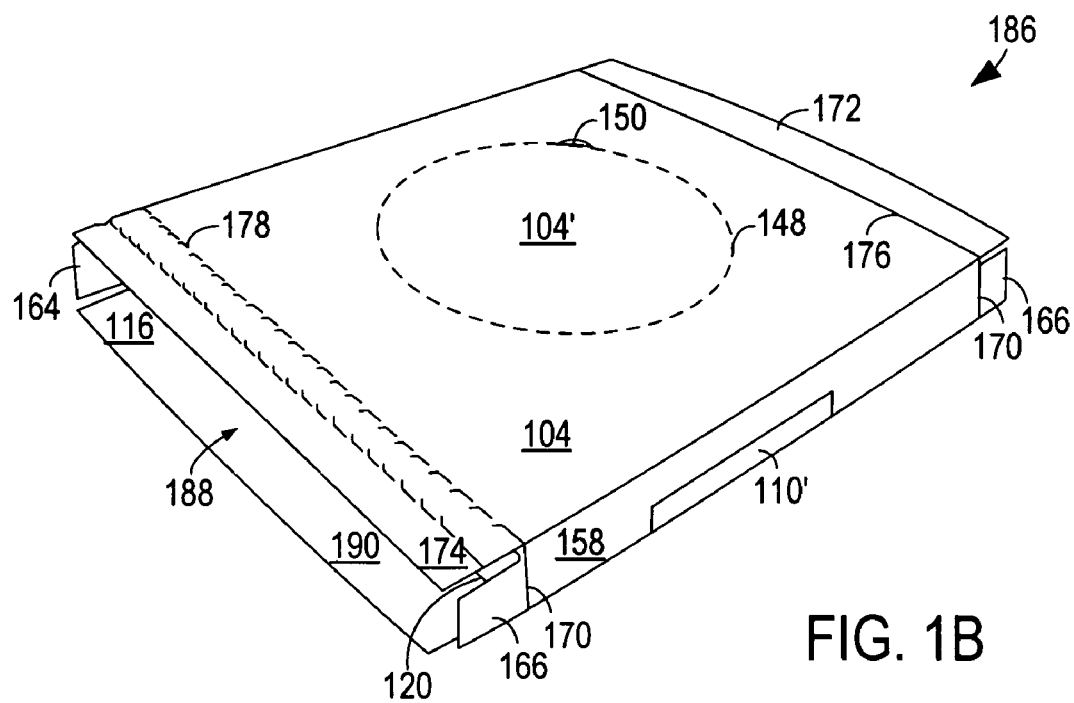
FIG. 1B is a schematic perspective view of a partially erected construct formed from the exemplary blank of FIG. 1A.
Figure 1C:
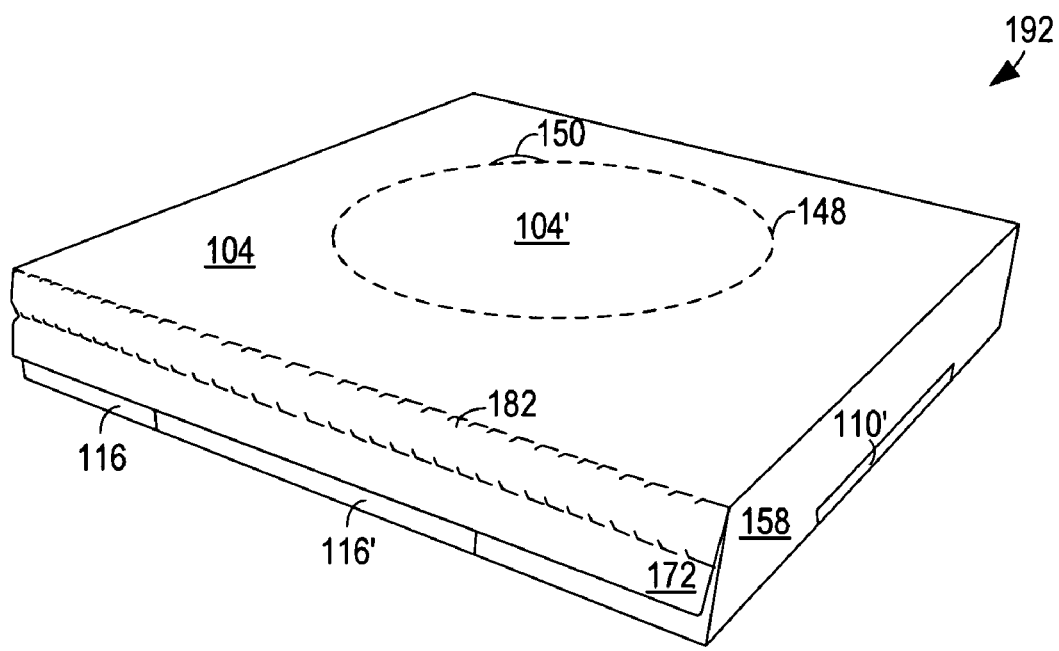
FIG. 1C is a schematic perspective view of a fully erected construct formed from the exemplary blank of FIG. 1A.

The blank 100 also includes a pair of end panels 172, 174 joined to panel 104. End panel 172 is joined to panel 104 along a transverse fold line 176. End panel 174 is joined to panel 104 along a transverse line of disruption, which in this example, is one tear line 178 of a pair of tear lines 178, 180 that collectively define a tear strip 182. In the illustrated embodiment, each tear line 178, 180 comprises a plurality of "zipper" cuts, each of which generally includes a transverse portion and an oblique portion, such that the plurality of cuts collectively resemble a zipper. However, other types of tear lines may be used to define the tear strip 182. It is noted that in this example both end panels 172, 174 have a first dimension D1 that is less than the first dimension D1 of the respective end panels 114, 116 to prevent overlap and/or interference with the operation of the respective hingeable portions 114', 116' of panels 114, 116 when the blank 100 is formed into a construct 192 (FIG. 1C). However, other configurations of panels and other types of cartons are encompassed by the disclosure.

If desired, a microwave energy interactive element 184 (shown schematically with stippling), for example, a susceptor, may overlie and/or may be joined to all or a portion of panel 104 to form a microwave energy interactive cover for the food item. In this example, the susceptor 184 is in the shape of a ring or annulus that encircles or circumscribes the removable portion 104'. The peripheral margin of panel 104, which circumscribes (i.e., extends around) the susceptor 184, is transparent to microwave energy. However other configurations and other microwave energy interactive elements may be used. For example, in one embodiment (not shown), the susceptor 184 may overlie the entirety of the panel 104.

To form a construct 192 (FIG. 1C) from the blank 100 according to one exemplary method, panels 102, 104 may be brought into a superposed arrangement by folding along fold lines 108, 156. Panels 158, 110 may be overlapped with one another by folding along respective fold lines 160, 112 and joined to one another adhesively, mechanically, or using any other suitable technique to form a somewhat tubular structure 186 having an interior space 188 or cavity for receiving the food item (not shown), as depicted in FIG. 1B. In this configuration, the microwave energy interactive elements 146, 184 (hidden from view in FIG. 1B) overlie and/or define at least a portion of an interior surface 190 of the structure 186.

The tuck-in panels 164, 166 may be folded toward the interior 186 of the tubular structure 186 along respective fold lines 168 (FIG. 1A), 170. End panels 114 (FIG. 1A), 116 may be folded inwardly toward the tuck-in panels 164, 166 by folding along respective fold lines 118 (FIG. 1A), 120. Likewise, end panels 172, 174 may be folded inwardly along fold lines (i.e. lines of disruption) 176, 178 and adhered respectively to end panels 114, 116 adhesively, mechanically, or using any other suitable technique to form the construct 192, as shown in FIG. 1C. In the fully erected construct 192, panels 102, 104 serve respectively as bottom and top panels 102, 104 of the construct 192, while panels 106, 110, 114, 116, 158, 172, 174 define side or end panels (or walls) (only visible panels labeled in FIG. 1C) of the construct 192.

The food item (not shown) may be inserted into the construct 192 at any suitable time. Alternatively, the construct 192 may be formed "around" the food item to be contained in the construct.

Figure 1D:
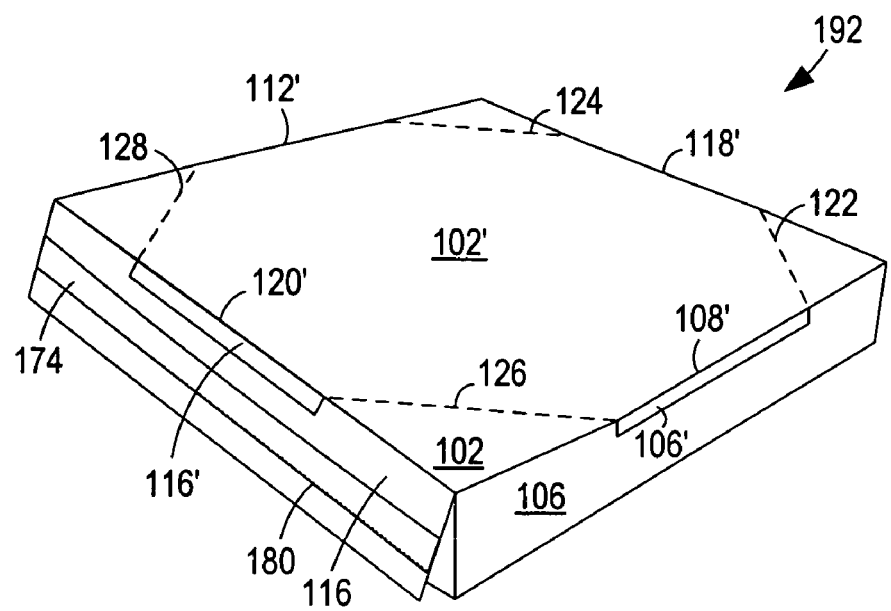
FIG. 1D is a schematic perspective view of the construct of FIG. 1C, in an inverted, partially open configuration.
Figure 1E:
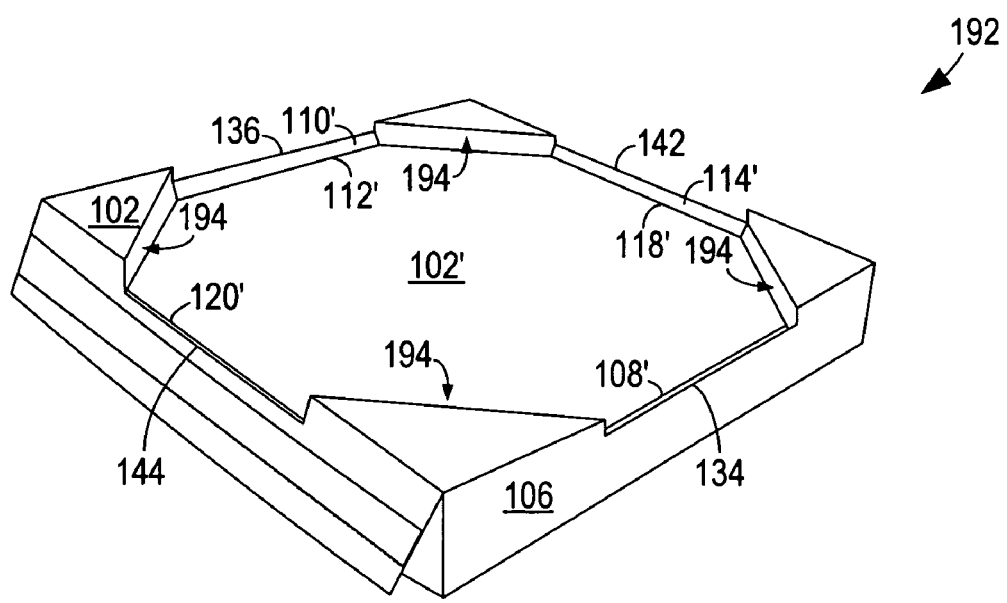
FIG. 1E is a schematic perspective view of the construct of FIG. 1D, with the movable panel moved toward the interior of the construct.

To use the construct 192 according to one exemplary method, the tear strip 182 may be activated (i.e., torn away from the remainder of the construct 192) to access the food item within the interior 188 (FIG. 1B) of the construct 192. The construct 192 then may be inverted as shown in FIG. 1D, and the movable portion 102' may be urged out of the plane of the remainder of the bottom panel 102 towards the interior space 188 by tearing along the lines of disruption 122, 124, 126, 128, folding along fold line portions 108', 112', 118', 120', and pivoting the hingeable portions 106', 110', 114', 116' along fold lines 134, 136, 142, 144, as shown in FIG. 1E. In this configuration, the remainder of the bottom panel 102 substantially lies in a first plane and the movable portion 102' lies in a second plane closer to the interior space 188. The distance between the first and second planes defines a plurality of venting gaps 194 adjacent to the remainder of the bottom panel (i.e., the corner portions) 102, as shown in FIG. 1E.

Figure 1F:
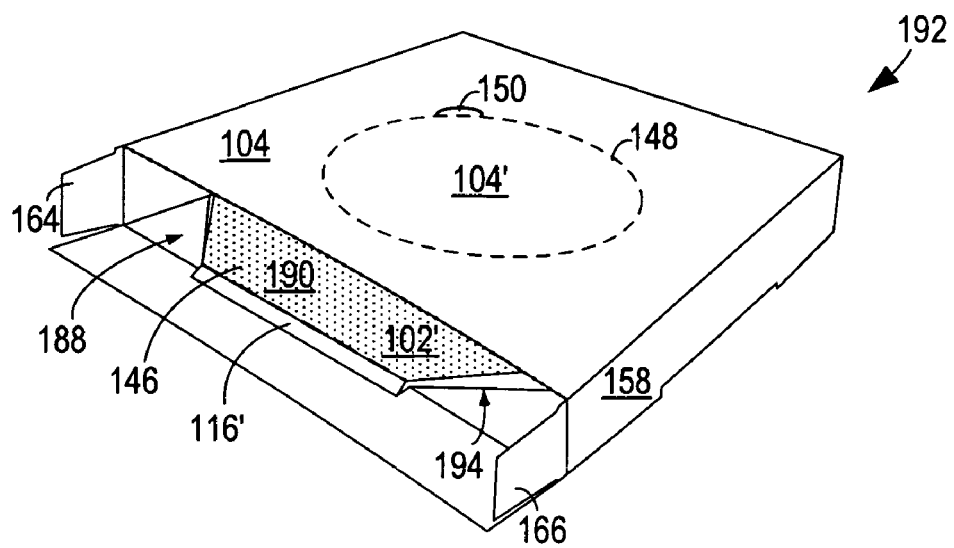
FIG. 1F is a schematic perspective view of the construct of FIG. 1E, in an upright configuration with an open end.

The construct 192 then may be inverted again to bring the construct 192 into an upright configuration, as shown schematically in FIG. 1F. In this configuration, the movable portion 102' of the bottom panel 102 is somewhat elevated, such that the movable portion 102' of the bottom panel 102 may serve as a platform 102' for receiving the food item. The platform 102' is maintained in an elevated position by hingeable portions 106', 110', 114', 116', such that the hingeable portions 106', 110', 114', 116' may be referred to as "elevating portions" or "elevating panels". A void (hidden from view) is formed beneath the platform 102'.

Figure 1G:
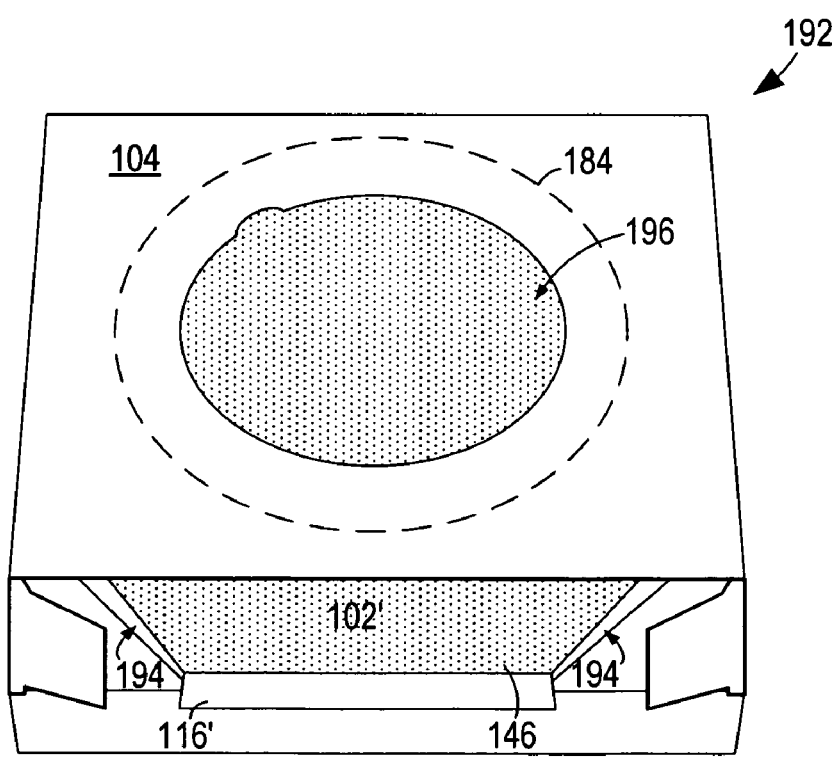
FIG. 1G is a schematic perspective view of the construct of FIG. 1F, with the removable portion removed from the top panel.

The removable portion 104' (FIG. 1F) of the top panel 104 may removed by grasping the tab 150 (or otherwise) and tearing along tear line 148, thereby forming an opening 196 in the top panel 104, as shown in FIG. 1G. The opening 196 may be configured (e.g., positioned and/or dimensioned) to overlie an area of the food item that is not intended to be browned and/or crisped, while all or a portion of the remainder of the top panel 104 (i.e., all of the top panel 104 except the removable portion 104') may be provided with a microwave energy interactive element, for example, susceptor 184 (shown with dashed lines in FIG. 1G), to overlie an area of the food item that is desirably browned and/or crisped. For example, where the food item is a pizza, the opening 196 may be dimensioned to overlie the toppings, while the susceptor 184 (FIG. 1A) may be dimensioned to overlie the top of the crust of the pizza. The opening 196 also may serve as an access opening or window through which the food item may be viewed and/or adjusted if needed (e.g., to rearrange the toppings on a pizza).

The food item may be reinserted into the interior space 188 at any suitable time, for example, before or after the removable portion 104' is removed. The food item within the construct 192 then may be heated in a microwave oven according to the package directions. After sufficient exposure to microwave energy, the microwave energy interactive elements 184, 146 on the respective interior side 190 of the bottom and top panels 102, 104 convert at least a portion of the impinging microwave energy into thermal energy, which then can be transferred to the surface of the food item to enhance browning and/or crisping. Further, the various elevating panels 106', 110', 114', 116' cooperate to support the platform 102' and maintain the food item in a raised position in the microwave oven. While not wishing to be bound by theory, it is believed that the air in the void between the platform 102' and the floor of the microwave oven provides an insulating effect that reduces the loss of heat from the susceptor 146 to the microwave oven. Thus, more of the heat generated by the susceptor is available for transfer to the food item. Additionally, the venting gaps 194 may allow any steam generated during heating to be carried away from the food item, thereby further browning and/or crisping the food item. The opening 196 in the top panel 104 and the open end of the construct 192 may provide additional venting. After heating, the food item can be removed from the construct 192 and served as desired.

It will be appreciated that the elevating panels 106', 110', 114', 116' and lines of disruption 122, 124, 126, 128 between the elevating panels 106', 110', 114', 116' can be configured to provide the desired degree of insulation and/or venting needed for a particular food item. For example, where less venting and/or insulation is needed, the elevating panels and lines of disruption can be configured to provide a smaller void or airspace beneath the construct and/or smaller venting gaps. Conversely, where additional insulation and/or venting is needed, the elevating panels and lines of disruption can be configured to provide a larger void or airspace beneath the construct and/or smaller venting gaps.

Numerous variations of the blank 100 and construct 192 of FIGS. 1A-1G are contemplated by the disclosure. Any of such variations may be used alone or in combination with one another.

Figure 2:
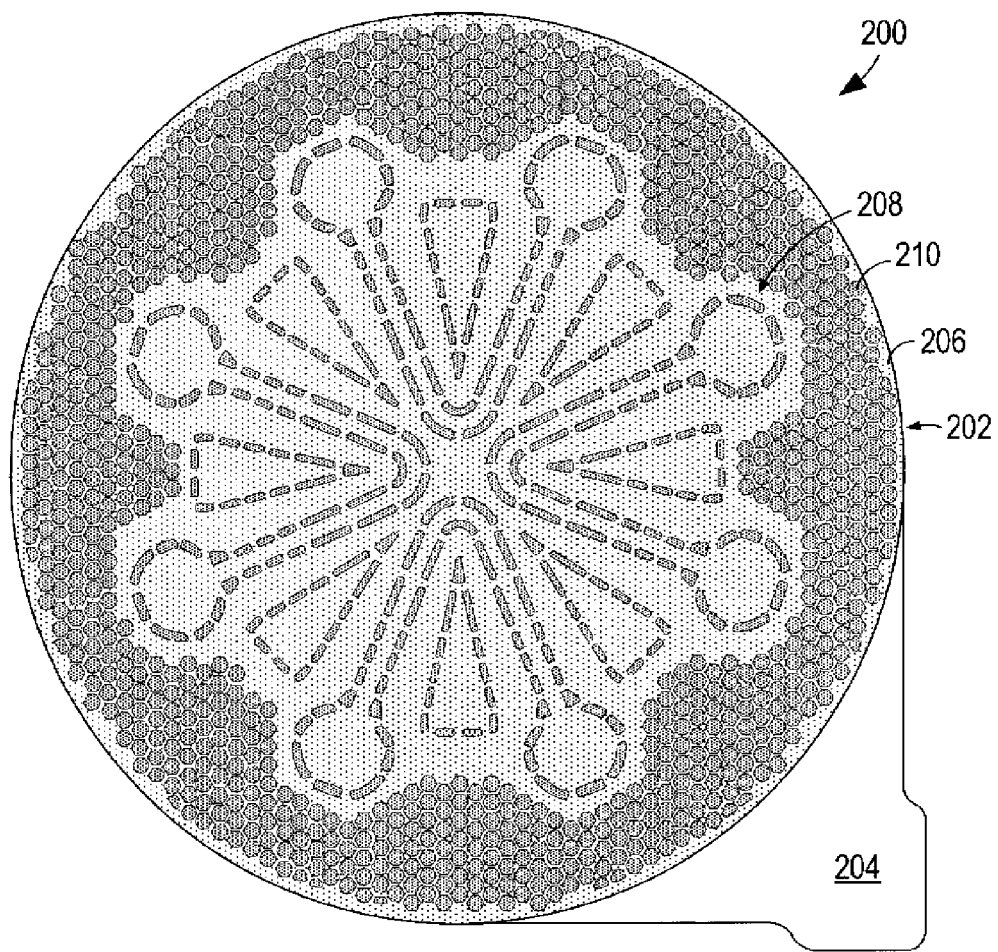
FIG. 2 is a schematic top plan view of an exemplary microwave energy interactive tray or card that may be used to heat, brown, and/or crisp a food item.

For example, in one variation, the construct 192 may be provided with a card, disk, or tray (generally "tray") 200 for supporting the food item, as shown in FIG. 2, to form a microwave heating system. In the example shown schematically in FIG. 2, the tray 200 includes a first portion 202 for receiving the food item and a second portion 204 that serves as a handle for grasping the tray 200. The first portion 202 is substantially circular in shape, for example, for receiving a somewhat circular food item, and the handle 204 is somewhat triangular or arrow-shaped. However, differently shaped trays and handles may be used. Further, the handle may be omitted if desired. The tray 200 may be dimensioned to be received in the interior 188 of the construct 192 (seated on the bottom panel 102 or on the elevated portion 102' of the bottom panel 102), such that the food item can remain seated on the tray 200 prior to, during, and/or after heating for conveniently transporting the food item to and from the interior space 188. In some instances, the tray 200 also may serve as a cutting "board" on which the food item may be divided into portions after heating. In any of such embodiments, the tray may be formed at least partially from a dimensionally-stable base material or support, for example, paperboard or plastic. The tray 200 may be provided as a separate component or may comprise a removable portion of the top panel, for example, as with removable portion 104' of panel 104.

If desired, the tray 200 may include one or more microwave energy interactive elements that alter the effect of microwave energy on the food item. In the illustrated example, the tray 200 includes a susceptor 206 (shown schematically with stippling) overlying and/or joined to the first portion 202 of the tray 200, such that when the tray 200 is inserted into the construct 192, the susceptor 206 on the tray 200 is at least partially superposed with the susceptor 146 on the bottom panel 102. In this manner, additional heat may be generated and transferred to the food item. In another variation, the susceptor 146 on the bottom panel 102 may be omitted.

The tray 200 also includes a plurality of metal foil segments, some of which are arranged to form a plurality of microwave energy distributing elements 208 that are operative for directing microwave energy towards the center of the tray 200, and therefore, towards the center of the food item seated on the tray 200. The remaining foil segments 210 (i.e., positioned along the peripheral margin of the tray) serve as microwave energy shielding elements for reducing the amount of microwave energy that reaches the peripheral margin of the food item. In this example, the shielding elements 210 are substantially hexagonal in shape, but differently shaped shielding elements may be used.

If desired, the second portion 204 of the tray 200 may be substantially transparent to microwave energy. As a result, the handle 204 may remain substantially cool after exposure to microwave energy so the handle can be gripped comfortably by a user. Exemplary methods of forming a microwave energy transparent handle will be discussed below.

In other embodiments, one or more of such elements 206, 208, 210 may be omitted, reconfigured, and/or replaced with other microwave energy interactive elements. Countless possibilities are contemplated. Further, it will be appreciated that the exemplary tray 200 of FIG. 2 and numerous others contemplated by the present disclosure may be used in numerous other embodiments and heating applications, with or without the construct 192 of FIGS. 1C-1G.

Figure 3:
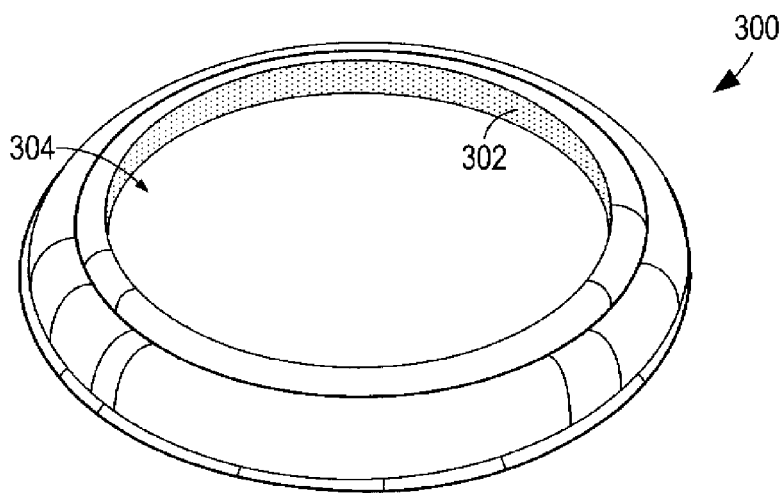
FIG. 3 is a schematic perspective view of an exemplary conventional microwave energy interactive ring that may be used to heat, brown, and/or crisp a food item.

In another exemplary system, the susceptor 184 on the top panel 104 may be omitted and the construct 192 may be provided with a microwave energy interactive cover for overlying all or a portion of the food item within the interior 188 of the construct 192. In one embodiment illustrated in FIG. 3, the cover comprises a conventional contoured ring 300 configured to overlie the peripheral margin of the food item. The inner side of the ring 300 may include a microwave energy interactive element, for example, a susceptor 302 (shown schematically with stippling) for overlying areas of the food item that are intended to be browned and/or crisped (e.g., the top surface and/or sides of the food item), for example, the crust of a pizza. The ring 300 includes a substantially circular opening 304 for overlying areas of the food item that are not intended to be browned and/or crisped, for example, the toppings of a pizza. Where the food item is shipped within the construct, the ring 300 also may serve to protect the food item during shipping.

In still another variation, the removable portion 104' of the top panel 104 may be omitted. In such examples, the construct 192 may include a window through which the food item may be viewed. The viewing window may comprise a polymer film or any other suitable material. Depending on the particular heating application, the user may be instructed to remove the polymer film prior to heating the food item in a microwave oven.

In other variations, the various panels, portions, and other features may independently have any suitable shape, for example, circular, oval, triangular, square, rectangular, pentagonal, hexagonal, heptagonal, octagonal, or any other regular or irregular shape. The shape of the various panels and the resulting construct may be determined by the shape of the food product, and it will be understood that different shapes are contemplated for different food products, for example, sandwiches, pizzas, pastries, doughs, and so forth.

Any of such constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the construct.

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

The microwave energy interactive material(s) may be used to form one or more microwave energy interactive elements or features that alter the effect of microwave energy on the adjacent food item. Each microwave energy interactive element comprises one or more microwave energy interactive materials or segments arranged in a particular configuration to absorb microwave energy, transmit microwave energy, reflect microwave energy, or direct microwave energy, as needed or desired for a particular microwave heating construct and food item. The microwave energy interactive element may be configured to promote browning and/or crisping of a particular area of the food item, shield a particular area of the food item from microwave energy to prevent scorching or overheating, or transmit microwave energy towards or away from a particular area of the food item.

For example, as discussed above, the microwave energy interactive element may comprise a susceptor element (e.g., elements 146, 184, 206, 302), i.e., a thin layer of microwave energy interactive material (generally less than about 100 angstroms in thickness, for example, from about 60 to about 100 angstroms in thickness, and having an optical density of from about 0.15 to about 0.35, for example, about 0.21 to about 0.28) that tends to absorb at least a portion of impinging microwave energy and convert it to thermal energy (i.e., heat). Susceptor elements often are used to promote browning and/or crisping of the surface of a food item. However, other microwave energy interactive elements, such as those described herein, are contemplated by the disclosure.

Alternatively or additionally, the microwave energy interactive element may comprise a foil or high optical density evaporated material having a thickness sufficient to reflect a substantial portion of impinging microwave energy. Such elements are typically formed from a conductive, reflective metal or metal alloy, for example, aluminum, copper, or stainless steel, in the form of a solid "patch" generally having a thickness of from about 0.000285 inches to about 0.05 inches, for example, from about 0.0003 inches to about 0.03 inches. Other such elements may have a thickness of from about 0.00035 inches to about 0.020 inches, for example, 0.016 inches.

Larger microwave energy reflecting elements may be used where the food item is prone to scorching or drying out during heating. Smaller microwave energy reflecting elements (e.g., elements 210) may be used to diffuse or lessen the intensity of microwave energy. A plurality of smaller microwave energy reflecting elements also may be arranged to form a microwave energy directing element (e.g., elements 208) to direct microwave energy to specific areas of the food item. If desired, the reflective elements of the microwave energy directing element may be arranged a loop having a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The breaks or apertures may extend through the entire structure, or only through one or more layers. The number, shape, size, and positioning of such breaks or apertures may vary for a particular application depending on the type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in one or more layers or materials used to form the construct, or may be a non-physical "aperture". A non-physical aperture is a microwave energy transparent area that allows microwave energy to pass through the structure without an actual void or hole cut through the structure. Such areas may be formed by simply not applying a microwave energy interactive material to the particular area, or by removing microwave energy interactive material in the particular area, by mechanically deactivating the microwave energy interactive material in the particular area, or by chemically deactivating the microwave energy interactive material in the particular area (such that the microwave energy interactive material is chemically transformed into a material that is substantially transparent to microwave energy). While both physical and non-physical apertures allow the food item to be heated directly by the microwave energy, a physical aperture also provides a venting function to allow steam or other vapors to escape from the interior of the construct.

The arrangement of microwave energy interactive and microwave energy transparent areas may be selected to provide various levels of heating, as needed or desired for a particular application. For example, where greater heating is desired, the total inactive (i.e., microwave energy transparent) area may be increased. In doing so, more microwave energy is transmitted to the food item. Alternatively, by decreasing the total inactive area, more microwave energy is absorbed by the microwave energy interactive areas, converted into thermal energy, and transmitted to the surface of the food item to enhance heating, browning, and/or crisping.

In some instances, it may be beneficial to create one or more discontinuities or inactive regions to prevent overheating or charring of the construct. Such areas may be formed by forming these areas of the construct without a microwave energy interactive material, by removing any microwave energy interactive material that has been applied, or by deactivating the microwave energy interactive material in these areas, as discussed above.

By way of example, and not limitation, in the tray 200 illustrated schematically in FIG. 2, it may be desirable to have the handle 204 remain substantially cool to the touch so that a user may grasp the handle comfortably. As such, the handle 204 may be designed to be microwave energy transparent, for example, by forming the handle 204 without a microwave energy interactive material, by removing any microwave energy interactive material that has been applied, or by deactivating the microwave energy interactive material in these areas.

Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment. This may be achieved using any suitable technique, such as those described above.

Any of the various microwave energy interactive elements (e.g., elements 146, 162, 206, 208, 210, 302) may be supported on a microwave inactive or transparent substrate, for example, paper, a polymer film, or other suitable polymeric material, for ease of handling and/or to prevent contact between the microwave energy interactive material and the food item. The outermost surface of the substrate may define at least a portion of the food-contacting surface of the package (e.g. surface 190). Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other non-conducting substrate materials such as paper and paper laminates, metal oxides, silicates, cellulosics, or any combination thereof, also may be used.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

Various materials may serve as the base material for the construct 192 (and for tray 200 and cover 300). For example, the construct may be formed at least partially from a polymer or polymeric material. As another example, all or a portion the construct may be formed from a paper or paperboard material. In one example, the paper has a basis weight of from about 15 to about 60 lbs/ream (lb/3000 sq. ft.), for example, from about 20 to about 40 lbs/ream. In another example, the paper has a basis weight of about 25 lbs/ream. In another example, the paperboard having a basis weight of from about 60 to about 330 lbs/ream, for example, from about 155 to about 265 lbs/ream. In one particular example, the paperboard has a basis weight of about 175 lbs/ream. The paperboard generally may have a thickness of from about 6 to about 30 mils, for example, from about 14 to about 24 mils. In one particular example, the paperboard has a thickness of about 16 mils. Any suitable paperboard may be used, for example, a solid bleached or solid unbleached sulfate board, such as SUS® board, commercially available from Graphic Packaging International.

The package may be formed according to numerous processes known to those in the art, including using adhesive bonding, thermal bonding, ultrasonic bonding, mechanical stitching, or any other suitable process. Any of the various components used to form the package may be provided as a sheet of material, a roll of material, or a die cut material in the shape of the package to be formed (e.g., a blank).

It will be understood that with some combinations of elements and materials, the microwave energy interactive element may have a grey or silver color that is visually distinguishable from the substrate or the support. However, in some instances, it may be desirable to provide a package having a uniform color and/or appearance. Such a package may be more aesthetically pleasing to a consumer, particularly when the consumer is accustomed to packages or containers having certain visual attributes, for example, a solid color, a particular pattern, and so on. Thus, for example, the present disclosure contemplates using a silver or grey toned adhesive to join the microwave energy interactive element to the support, using a silver or grey toned support to mask the presence of the silver or grey toned microwave energy interactive element, using a dark toned substrate, for example, a black toned substrate, to conceal the presence of the silver or grey toned microwave energy interactive element, overprinting the metallized side of the polymer film with a silver or grey toned ink to obscure the color variation, printing the non-metallized side of the polymer film with a silver or grey ink or other concealing color in a suitable pattern or as a solid color layer to mask or conceal the presence of the microwave energy interactive element, or any other suitable technique or combination of techniques.

Although certain embodiments of this invention have been described with a certain degree of particularity, those skilled in the art could make numerous alterations without departing from the spirit or scope of this invention. Any directional references (e.g., upper, lower, upward, downward, left, right, leftward, rightward, top, bottom, above, below, vertical, horizontal, clockwise, and counterclockwise) are used only for identification purposes to aid the reader's understanding of various embodiments, and do not create limitations, particularly as to the position, orientation, or use of the invention unless specifically set forth in the claims. The relative terms "lower" and "upper" indicate orientations determined in relation to fully erected constructs. The terms "end" and "side" are not intended to convey any relative size difference between end panels and side panels except as specifically recited. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be understood that in each of the various blanks and packages contemplated hereby, a "fold line" can be any substantially linear, although not necessarily straight, form of weakening that facilitates folding therealong. More specifically, but not for the purpose of narrowing the scope of the present invention, a fold line may be a score line, such as lines formed with a blunt scoring knife, or the like, which creates a crushed portion in the material along the desired line of weakness, a cut that extends partially into a material along the desired line of weakness, and/or a series of cuts that extend partially into and/or completely through the material along the desired line of weakness, or any combination of these features.

For example, one type of conventional tear line is in the form of a series of cuts that extend completely through the material, with adjacent cuts being spaced apart slightly so that a nick (e.g., a small somewhat bridging-like piece of the material) is defined between the adjacent cuts for typically temporarily connecting the material across the tear line. The nicks are broken during tearing along the tear line. Such a tear line that includes nicks can also be referred to as a cut line, since the nicks typically are a relatively small percentage of the subject line, and alternatively the nicks can be omitted from such a cut line.

Furthermore, various exemplary blanks and constructs are shown and described herein as having fold lines, tear lines, score lines, cut lines, kiss cut lines, and other lines as extending from a particular feature to another particular feature, for example from one particular panel to another, from one particular edge to another, or any combination thereof. However, it will be understood that such lines need not necessarily extend between such features in a precise manner. Instead, such lines may generally extend between the various features as needed to achieve the objective of such line. For instance, where a particular tear line is shown as extending from a first edge of a panel to another edge of the panel, the tear line need not extend completely to one or both of such edges. Rather, the tear line need only extend to a location sufficiently proximate to the edge so that the removable strip, panel, or portion can be manually separated from the blank or construct without causing undesirable damage thereto.

It will be readily understood by those persons skilled in the art that the present invention is susceptible of broad utility and application. It will also be recognized by those skilled in the art that various elements discussed with reference to the various embodiments may be interchanged to create entirely new embodiments coming within the scope of the present invention. While the present invention is described herein in detail in relation to specific embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. Many adaptations of the present invention other than those herein described, as well as many variations, modifications, and equivalent arrangements will be apparent from or reasonably suggested by the present invention and the above detailed description without departing from the substance or scope of the present invention. Accordingly, the detailed description set forth herein is not intended nor is to be construed to limit the present invention or otherwise to exclude any such other embodiments, adaptations, variations, modifications, and equivalent arrangements of the present invention.

What is claimed is:

1. A microwave heating construct, comprising:
   a top panel including a line of disruption that defines a removable portion of the top panel; and
   a bottom panel opposite the top panel, the bottom panel including a plurality of lines of disruption that define a movable portion of the bottom panel and a remaining portion of the bottom panel, wherein the lines of disruption each extend between pairs of adjacent peripheral edges of the bottom panel,
   wherein
      the movable portion of the bottom panel and an area of the top panel that circumscribes the removable portion of the top panel each include microwave energy interactive material, and
      the movable portion of the bottom panel is operative for being moved towards the top panel, wherein the construct is configured so that
         moving the movable portion of the bottom panel brings the movable portion of the bottom panel into closer proximity with the microwave energy interactive material of the top panel, and
         the movable portion of the bottom panel is maintained in closer proximity to the microwave energy interactive material of the top panel.

2. The construct of claim 1, wherein the lines of disruption define chamfered corners of the movable portion of the bottom panel.

3. The construct of claim 1, further comprising fold lines extending substantially between adjacent pairs of lines of disruption.

4. The construct of claim 3, wherein the fold lines lie substantially along the peripheral edges of the bottom panel.

5. The construct of claim 3, wherein the movable portion of the bottom panel is substantially octagonal in shape.

6. The construct of claim 1, further comprising a plurality of side panels extending between the top panel and the bottom panel, wherein the side panels each include a hingeable portion foldably joined to the movable portion of the bottom panel.

7. The construct of claim 6, wherein each hingeable portion is foldably joined to the movable portion of the bottom panel along the respective peripheral edge of the bottom panel.

8. The construct of claim 6, wherein each hingeable portion is defined by a plurality of lines of disruption in the respective side panel.

9. The construct of claim 8, wherein the plurality of lines of disruption in the respective side panel includes
   a pair of lines of disruption extending from the respective peripheral edge of the bottom panel towards the top panel, and
   a fold line extending between the pair of lines of disruption extending from the respective peripheral edge of the bottom panel.

10. The construct of claim 6, wherein the hingeable portions of the side panels are operative for supporting the movable portion of the bottom panel when the movable portion of the bottom panel is moved towards the top panel.

11. The construct of claim 1, wherein the microwave energy interactive material of the top panel and the movable portion of the bottom panel is operative for converting at least a portion of impinging microwave energy into thermal energy.

12. The construct of claim 1, wherein the removable portion of the top panel is substantially circular in shape.

13. The construct of claim 1, wherein the microwave energy interactive material of the top panel has a generally annular shape.

14. The construct of claim 1, further comprising a contoured ring for being positioned between the top panel and the bottom panel, wherein the contoured ring comprises microwave energy interactive material.

15. The construct of claim 14, wherein the contoured ring circumscribes an opening.

16. The construct of claim 1, further comprising a tray for being positioned on the bottom panel, wherein the tray includes
   a first portion comprising microwave energy interactive material operative for converting at least a portion of impinging microwave energy into thermal energy, and
   a second portion that is substantially transparent to microwave energy.

17. The construct of claim 16, wherein the first portion of the tray further includes a plurality of metal foil segments operative for directing microwave energy towards the center of the tray.

18. The construct of claim 1, in combination with a food item, wherein the food item has a lower surface and an upper surface that are each desirably at least one of browned and crisped.

19. The combination of claim 18, wherein the food item is positioned on the movable portion of the bottom panel so that the microwave energy interactive material of the movable portion is proximate to the lower surface of the food item.

20. A method of using the combination of claim 19, comprising moving the movable portion of the bottom panel towards the top panel, so that the upper surface of the food item is brought into closer proximity to the microwave energy interactive material of the top panel.

21. The method of claim 20, wherein moving the movable portion of the bottom panel towards the top panel defines venting gaps between the movable portion of the bottom panel and the remaining portion of the bottom panel.

22. The method of claim 20, wherein
the microwave energy interactive material of each the top panel and the moveable portion of the bottom panel is operative for converting microwave energy into heat, and
the method further comprises exposing the food item to microwave energy, so that the microwave energy interactive material of the top panel and the moveable portion of the bottom panel convert microwave energy into heat and
at least one of browns and crisps the lower surface of the food item, and
at least one of browns and crisps the upper surface of the food item.

23. A microwave heating construct, comprising:
a top panel including a removable portion for being separated from the construct to define an opening in the top panel, wherein the top panel includes microwave energy interactive material extending around the removable portion,
a bottom panel opposite the top panel, the bottom panel including a movable portion comprising microwave energy interactive material, the movable portion of the bottom panel being defined at least partially by
a plurality of lines of disruption extending across the bottom panel between pairs of adjacent peripheral edges of the bottom panel, and
a plurality of fold lines extending between adjacent pairs of the plurality of lines of disruption; and
a plurality of side panels extending between the top panel and the bottom panel, the side panels each including a hingeable portion foldably joined to the movable portion of the bottom panel,
wherein the lines of disruption are for being breached so that the movable portion of the bottom panel can move towards the top panel, wherein moving the movable portion of the bottom panel towards the top panel is for moving a food item seated thereon into closer proximity with the microwave energy interactive material of the top panel.

24. The construct of claim 23, in combination with the food item, wherein the food item has
an upper peripheral surface that is desirably at least one of browned and crisped,
an upper central surface that is not desirably browned or crisped, and
a lower surface that is desirably at least one of browned and crisped.

25. The combination of claim 24, wherein the food item is positioned on the movable portion of the bottom panel so that the microwave energy interactive material of the movable portion of the bottom panel underlies the lower surface of the food item.

26. A method of using the combination of claim 25, comprising
breaching the lines of disruption, and
moving the movable portion of the bottom panel towards the top panel so that
the upper peripheral surface of the food item is proximate to the microwave energy interactive material of the top panel, and
the opening overlies the upper central surface of the food item.

27. The method of claim 26, wherein moving the movable portion of the bottom panel towards the top panel defines a void beneath the movable portion of the bottom panel.

28. The method of claim 26, wherein
the microwave energy interactive material of each the top panel and the moveable portion of the bottom panel is operative for generating heat in response to microwave energy, and
the method further comprises exposing the food item positioned on the movable portion of the bottom panel to microwave energy, so that the microwave energy interactive material of each the top panel and the moveable portion of the bottom panel generates heat and
the upper peripheral surface of the food item is at least one of browned and crisped, and
the lower surface of the food item is at Least one of browned and crisped.

29. A microwave heating construct, comprising:
a top panel including a removable portion for being separated from the construct, wherein the top panel includes microwave energy interactive material extending around the removable portion,
a bottom panel opposite the top panel, the bottom panel including a movable portion comprising microwave energy interactive material, the movable portion of the bottom panel being defined at least partially by
a plurality of lines of disruption extending across the bottom panel between pairs of adjacent peripheral edges of the bottom panel, and
a plurality of fold lines extending between adjacent pairs of the plurality of lines of disruption,
wherein the bottom panel is substantially rectangular in shape, so that the movable portion of the bottom panel is substantially octagonal in shape, and so that the lines of disruption define a remaining portion of the construct; and
a plurality of side panels extending between the top panel and the bottom panel, the side panels each including a hingeable portion foldably joined to the movable portion of the bottom panel, the hingeable portion of each side panel being operative for moving with the movable portion of the bottom panel,
wherein the movable portion of the bottom panel is for moving a food item seated on the movable portion of the bottom panel towards the microwave energy interactive material of the top panel, and
defining a void beneath the movable portion of the bottom panel, so that the remaining portion of the bottom panel supports the construct.

30. The construct of claim 29, in combination with a food item, wherein the food item has
- an upper surface that is desirably at least one of browned and crisped, and
- a lower surface that is desirably at least one of browned and crisped.

31. The combination of claim 30, wherein the food item is positioned on the movable portion of the bottom panel so that the microwave energy interactive material of the movable portion of the bottom panel underlies the lower surface of the food item.

32. A method of using the combination of claim 31, comprising
- moving the food item seated on the movable portion of the bottom panel towards the microwave energy interactive material of the top panel so that the microwave energy interactive material of the top panel overlies the upper surface of the food item, and
- defining the void beneath the movable portion of the bottom panel, so that the remaining portion of the bottom panel serves to support the construct.

33. The method of claim 32, wherein moving the food item seated on the movable portion of the bottom panel towards the microwave energy interactive material of the top panel defines venting gaps adjacent to the remaining portion of the bottom panel.

34. The method of claim 32, wherein
- the microwave energy interactive material of each the top panel and the moveable portion of the bottom panel is operative for heating in response to microwave energy, and
- the method further comprises exposing the food item to microwave energy, so that the microwave energy interactive material of each the top panel and the moveable portion of the bottom panel heats and
- the upper surface of the food item is at least one of browned and crisped, and
- the lower surface of the food item is at least one of browned and crisped.

* * * * *